Sept. 21, 1948.    L. E. ASKE    2,449,924
ROTOR FOR AXIAL POLE INDUCTION MOTORS
Filed April 3, 1946    3 Sheets-Sheet 1
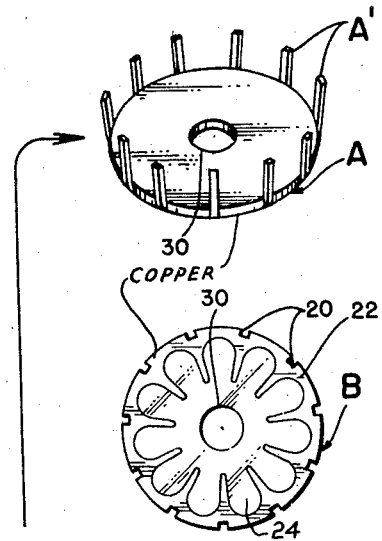
FIG.1
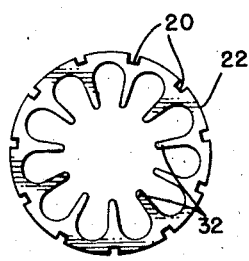
FIG.2
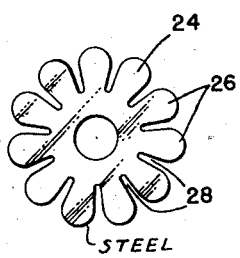
FIG.3
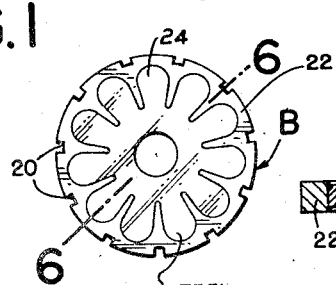
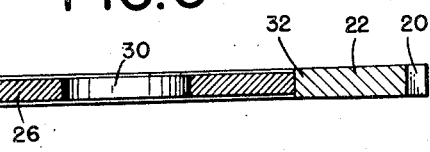
FIG.6
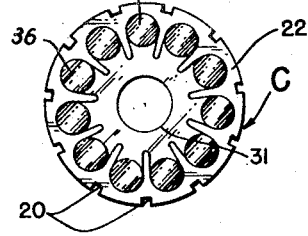
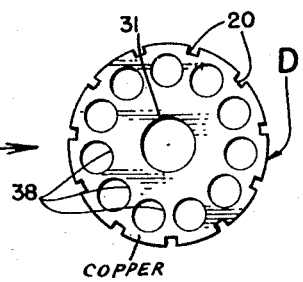
FIG.5
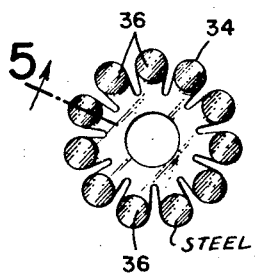
FIG.4
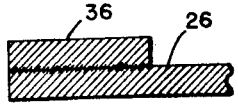
INVENTOR:—
LEONARD E. ASKE
BY Arthur R. Wylie
ATTY.

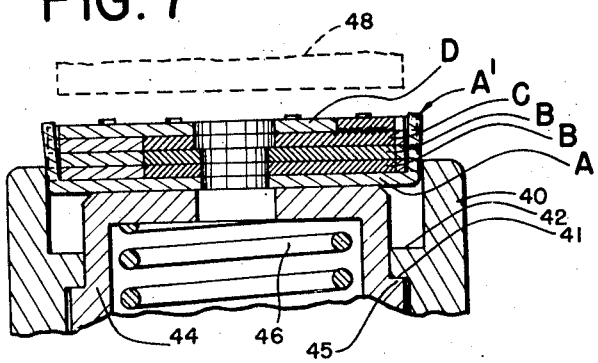
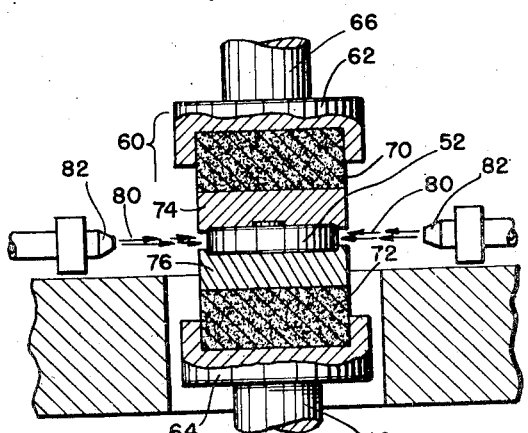
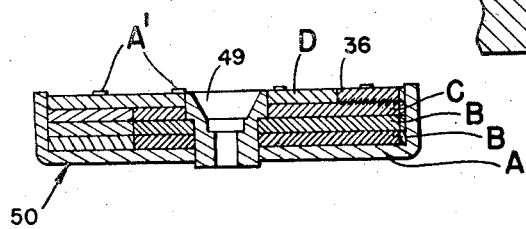
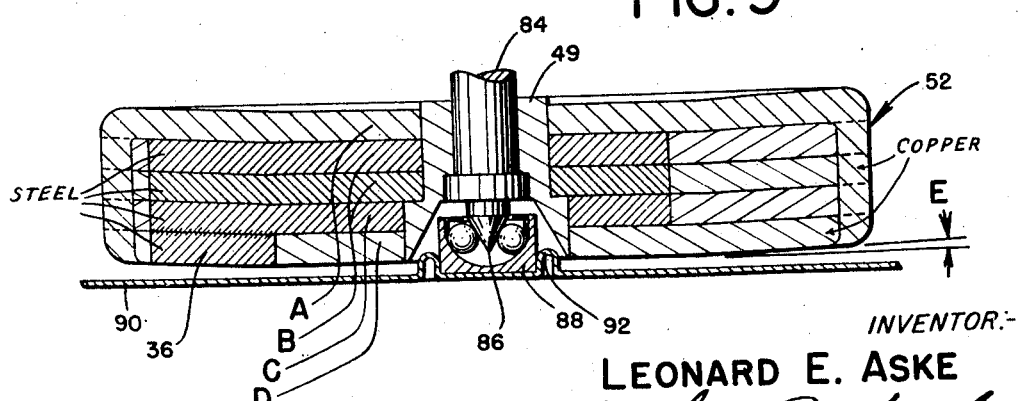

Sept. 21, 1948.  L. E. ASKE  2,449,924
ROTOR FOR AXIAL POLE INDUCTION MOTORS
Filed April 3, 1946  3 Sheets-Sheet 3
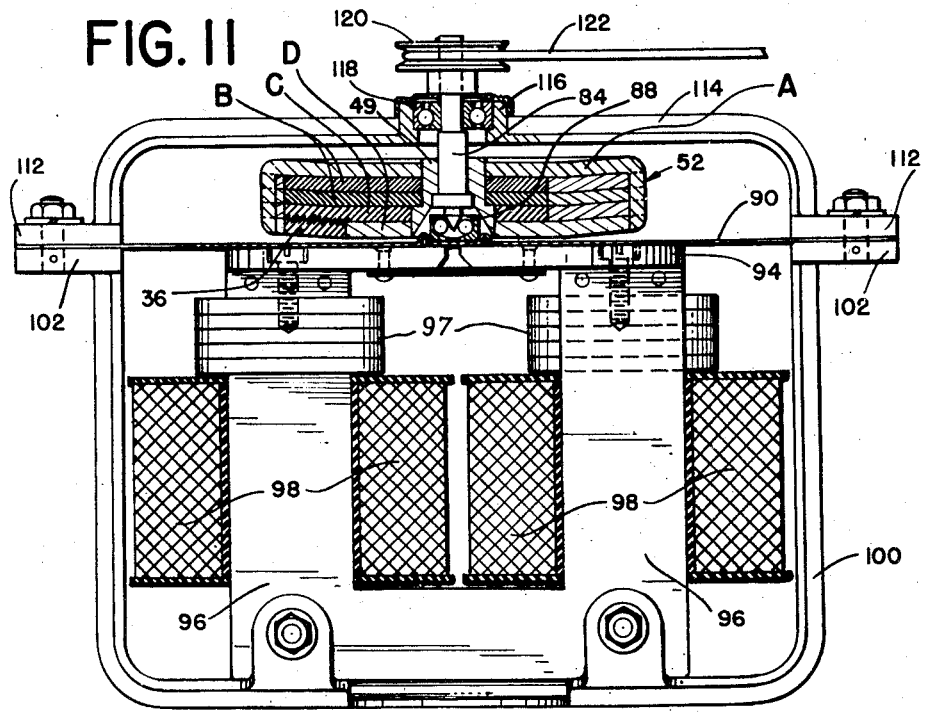
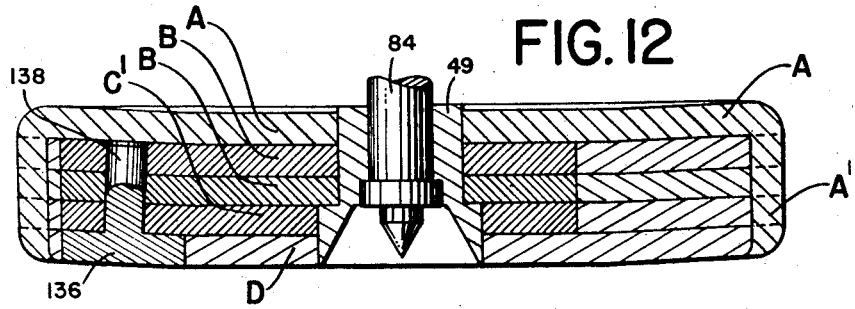
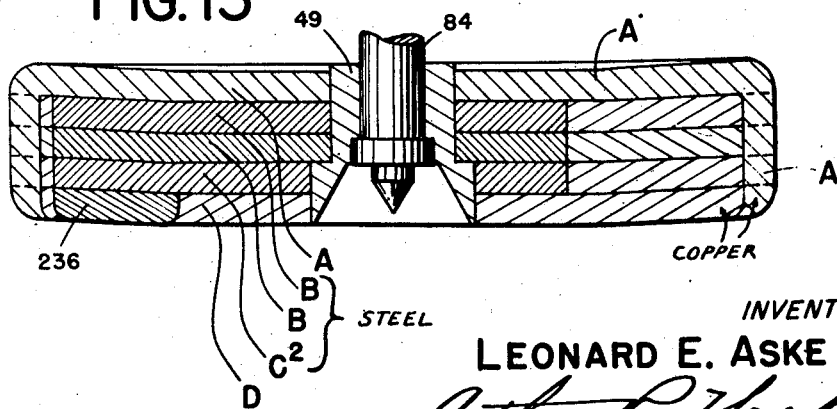
INVENTOR:-
LEONARD E. ASKE Patented Sept. 21, 1948

2,449,924

UNITED STATES PATENT OFFICE 2,449,924

ROTOR FOR AXIAL POLE INDUCTION MOTORS

Leonard E. Aske, Minneapolis, Minn., assignor to General Mills, Inc., a corporation of Delaware Application April 3, 1946, Serial No. 659,217

16 Claims. (Cl. 172—278)

1

This invention relates to axial pole induction motors and particularly to rotors therefor and their manufacture.

An object of the invention is to provide an improved self-contained rotor which when placed in the rotating field of an induction motor will tend to rotate therewith even when the rotor is removed some distance from the motor pole pieces.

Another object is the provision of an improved method of making such a rotor with laminated sections.

Still another object is the provision of laminated rotor sections which when assembled make up a complete self-contained rotor.

These and other objects as will hereinafter appear are fully described in the following specification and shown in the accompanying drawings in which Figure 1 is a view of the several disassembled parts of the rotor;

Fig. 2 is a stamping of the outer rim of one of the rotor sections;

Fig. 3 is a similar view of the inner paramagnetic section;

Fig. 4 is a similar view of the bottom section;

Fig. 5 is a greatly enlarged section on the line 5 of Fig. 4;

Fig. 6 is an enlarged section on the line 6—6 of Fig. 1;

Fig. 7 is a partial enlarged vertical section through the assembled rotor and through a machine for initially assembling it and partially closing the retaining fingers;

Fig. 8 is a transverse section through the assembled rotor after being assembled in the mechanism of Fig. 7;

Fig. 9 is a partial enlarged section corresponding to the line 6—6 of Fig. 1, through the rotor after it has been passed through a coining press showing a center assembled therein together with a shaft, a lower pivot bearing, and part of the mounting therefor;

Fig. 10 is a partial vertical section through a press by means of which heat is applied to the coined rotor;

Fig. 11 is a vertical section through a motor showing this rotor and its mounting therein;

Fig. 12 is a section similar to Fig. 9 but showing riveted rotor sections; and

Fig. 13 is a similar section showing loose buttons retained by the enclosing copper sheath.

The rotor itself shown disassembled in Fig. 1 consisting essentially of a disk A, preferably of commercial copper of high electric conductivity,

2 having a series of upstanding fingers $A^1$ together with one or more rotor sections B, preferably two in number, a rotor section C similar to the section B but having a series of cylindrical buttons of magnetic material, preferably non-corrosive, extending downwardly to the outer edge of sheath D of copper outside the lowermost section C, sheath D having a series of openings through which extend the cylindrical buttons referred to above. To secure these parts together and to insure a proper alignment of the same, the members B, C, and D are provided with peripheral notches 20 into which may be forced the upstanding fingers $A^1$ as will later be more fully explained. During the assembly of these parts the fingers $A^1$ extend outwardly with a divergence of about 5° from the vertical axis as may be seen in Figs. 1 and 7.

Each part of B is made up of an outer punching preferably of copper 22, having a thin layer of tin on its upper and lower surfaces as well as a spider-like punching 24 of a high grade sheet magnetic material such as iron or steel or alloy, and is so formed as to tightly fit the inner contour of the punching 22 so as to assemble as in Fig. 6.

Thus the punching 24 is provided with a series of lobes 26 with intermediate notches 28, all uniformly spaced about the axis of the punching with the outer ends of the lobes having equal radii at equal distances from the center of the punching and the notches 28 being made as deep as practicable, namely about one-half the distance from the outer end of the lobe to the center of the punching.

In addition to this, all the various parts of the assemblage, namely A, B, B, C, and D, are provided with centrally located holes. The holes 30 in A, B and B are of one size, while the holes 31 in C and D are larger and all are adapted to register coaxially when the rotor is assembled for the insertion of a central bushing as will later be explained.

The copper punching 22 has similar inwardly extending fingers 32 which fit into the notches 28 in the steel spider 24, but not so tightly but that they can be snapped together by hand. It will be observed, however, in Fig. 6 that the outer copper punching 22 is slightly thicker than the steel punching 26 so that when heavy pressure is applied thereto this copper is forced accurately into these notches.

The steel spider 34 of Fig. 4 is the same as the spider 24 of Fig. 3, but in addition thereto, each of the outer lobes is provided with a circular button 36 whose radius matches the outer radius of the lobes and is electrically welded thereto as shown in Fig. 5. This spider is then assembled in a copper punching 22 as before.

The lowermost section, namely D of Fig. 1, consists of a disk having a series of openings 38 each adapted to fit over one of the buttons 36.

To assemble these several sections, the operator takes the enclosing concentric disk A and as shown in Fig. 7 inserts it in an assembly ring 40, of which the bottom 42 is at or slightly below the height of the upstanding fingers $A^1$. Within the ring 40 and concentric therewith, is an ejector member 44 normally pressed axially upward to the position shown in Fig. 7 by means of a spring 46 in which a shoulder 45 on the member 44 engages a shoulder 41 in the ring 40. Above the assembly ring and concentric therewith is a piston 48, operable axially downward, under the control of the operator for completing the initial assembly of the parts of the rotor. With the parts as shown in Fig. 7, the operator places an enclosing disk A in the assembly ring 40. Then within the upstanding diverging fingers $A^1$, he assembles the elements B, B, C, and D, taking care that the notches 20 in all cases register with the fingers $A^1$. He may then insert the stepped bushing 49, preferably of stainless steel, or it may be inserted after this initial operation as later will be explained.

He then lowers the piston 48 by any suitable means, not shown, lowering the ejector member 44, compressing the spring 46 and lowering the disk A into contact with the shoulder 42. This forces the several sections of the rotor into contact with each other, particularly the outer copper punchings and at the same time forcing the fingers $A^1$ inwardly into the several notches 20 and leaving the whole in the rounded condition shown in Fig. 8. This is the first assembly operation on the rotor, which in this form is designated generally as 50. If the stepped bushing 49 has not previously been assembled in the rotor, it is now inserted.

This rotor is then placed in a coining press and squeezed under enormous pressure into the shape shown in Fig. 9 designated generally as 52. The bottom and top are tapered upwardly at an angle E of about 2° so as to give greater clearance over the bottom of a vessel in which the rotor rotates as will later be described. The copper flows into all crevices and all the steel punchings are forced into contact with each other. The coined rotor of Fig. 9 is then placed in a press 60, as shown in Fig. 10, which is placed under a moderate pressure by means, not shown, with top and bottom electrodes 62, 64 insulated from each other and from the rest of the press in any suitable manner, not shown, these electrodes being connected through leads 66, 68 to any suitable source of electric energy. Carbon piles 70, 72 connect the electrodes 62, 64 with contacts 74, 76 which partially surround and grip the rotor 52. When current passes through this rotor, sufficient heat is generated to cause the tin between adjacent layers of the copper to fuse together, thereby making a substantially monolithic structure of the several layers of copper constituting the disk A and the outer copper portions of the members B, B, C, and D.

When, therefore, this rotor is placed in a rotating magnetic field, this field travels readily through the iron central portions 36, 26, etc., of the members B, B and C. The narrow vertical sections of copper filling the notches 20 being thus rendered substantially continuous, readily carry electric currents which are generated therein by the changing magnetic flux through which they cut as the rotor rotates. Thus it will be seen that this combination makes for a very efficient rotor of this type, and an efficient method of making the same is also disclosed.

As soon as the rotor 52 in the press, as shown in Fig. 10, reaches a predetermined degree of heat which can readily be determined after a few trials, electric current through the leads 64, 66 is promptly cut off and a number of sprays of water 80 are directed at the rotor by means of suitable jets 82 from different sides so as to rapidly reduce its temperature. The press can then be opened, the rotor removed and a new one inserted for a similar treatment. A shaft 84 for mounting the rotor may be pressed into the bushing 49, and preferably has a shouldered and tapered lower end at the bottom for operation in a pivot ball bearing 88 which is supported on a stainless steel or any suitable material 90 which is non-magnetic and has a relatively high ohmic resistance. Other non-magnetic materials may be used, such as plastics, wood, glass and the like. This sheet has a head 92 raised to surround and position the bearing. The sheet 98 (Fig. 11) rests on the pole pieces 94 of the laminated field magnets 96 which have shading coils 97 and field windings 98 the latter being connected to a suitable source of alternating current. A bottom member 100 supports the field windings and has at the top, flanges 102 on the level of the pole pieces 94. These flanges cooperate with similar flanges 112 on the top member 114 which has a circular flange 116 in which is seated a ball bearing 118 for the upper end of the shaft 85 on which may be keyed a sheave 120 to drive a belt 122 or other means for taking power off the shaft 85.

In Fig. 12 is shown a modified form of rotor in which the buttons 136 form fillister heads of rivets whose stems 138 pass through holes in the lobes of the sheet metal members B, B, and $C^1$ and are then riveted over to firmly secure them all together and insure better permeability to magnetic lines of force. The members are otherwise as shown in Figs. 1, 2 and 3.

Fig. 13 shows still another form of rotor in which the members A, B and B are the same as in Fig. 1, but having a button of steel 236 punched with the sharp or burred edge turned up into contact with the steel member $C^2$ while its rounded lower edge is enclosed in the copper member D which retains it in place.

Thus it will be seen I have provided very simple and efficient forms of rotors for shaded pole induction motors.

While I have shown and described but a few embodiments of my invention, it is to be understood that it is capable of many modifications. Changes, therefore, may be made which do not depart from the spirit and scope of my invention as disclosed in the appended claims.

I claim as my invention:

1. A disk rotor for an axial pole induction motor comprising a plurality of rotor sections each made up of a steel center having a series of radiating lobes with intermediate notches, with an enclosing concentric disk of copper or the like to accurately fit the contour of the lobes and notches, and a pair of copper end plates between which the sections are fixed, one of the plates having a series of radiating fingers bent to fit into peripheral notches in the rotor sections to tie the several sections of the rotor together.

2. A rotor according to claim 1 in which the radial distance from the rotor axis to the inner edge of each intermediate notch is substantially one-half the radial distance from the axis to the outer edge of each lobe.

3. A disk rotor for an axial pole induction motor comprising a plurality of rotor sections each made up of a steel center having a series of radiating lobes with intermediate notches, with an enclosing concentric disk of copper or the like to accurately fit the contour of the lobes and notches, a pair of copper end plates between which the sections are fixed, one of the plates having a series of radiating fingers bent to fit into peripheral notches in the rotor sections to tie the several sections of the rotor together, one of the plates having circular openings corresponding to each lobe of the adjacent rotor section, and a steel cylindrical button secured to each lobe of said adjacent section and projecting through the corresponding opening.

4. A rotor according to claim 3 in which the steel buttons are spot-welded to their respective lobes.

5. A rotor according to claim 3 in which the copper at the edge of each end plate opening partially overlaps the corresponding button to hold the button against its lobe.

6. A disk rotor for an axial pole induction motor comprising a plurality of rotor sections each made up of a steel center having a series of radiating lobes with intermediate notches, with an enclosing concentric disk of copper or the like to accurately fit the contour of the lobes and notches, a pair of copper end plates between which the sections are fixed, one of the plates having a series of radiating fingers bent to fit into peripheral notches in the rotor sections to tie the several sections of the rotor together, one of the plates having circular openings corresponding to each lobe of the adjacent rotor section, and steel rivets extending axially through the corresponding lobes of all the rotor sections to secure them together, each rivet having a cylindrical head projecting through the corresponding plate opening.

7. The method of making a rotor for an axial pole induction motor which comprises the steps of forming a flat central rotor portion from magnetic material with spaced radial projections separated by notches, forming a flat outer rotor portion of non-magnetic electroconductive material having an inner edge of a shape complementary to the projections and notches, separately assembling each pair of central and outer portions by telescoping them concentrically in a common plane to form a rotor section, and subsequently assembling and securing a plurality of the rotor sections in adjacent parallel relation on a common axis.

8. The method of making a rotor for an axial pole induction motor which comprises the steps of forming a flat central rotor portion from magnetic material with spaced radial projections separated by notches, forming a flat outer rotor portion of non-magnetic electroconductive material having an inner edge of a shape complementary to the projections and notches, separately assembling each pair of central and outer portions by telescoping them concentrically in a common plane to form a rotor section, subsequently assembling a plurality of the rotor sections in adjacent parallel relation between end plates of non-magnetic electroconductive material, and securing the sections and plates together.

9. The method of making a rotor for an axial pole induction motor which comprises the steps of forming a flat central rotor portion from magnetic material with spaced radial projections separated by notches, forming a flat outer rotor portion of non-magnetic electroconductive material having an inner edge of a shape complementary to and adapted to fit loosely around the projections and notches, separately assembling each pair of central and outer portions by telescoping them concentrically in a common plane to form a rotor section, subsequently assembling a plurality of the rotor sections in adjacent parallel relation between end plates of non-magnetic electroconductive material, and compressing the sections and plates axially together to squeeze the outer portions into firm contact with each other and with their respective central portions.

10. The method of making a rotor for an axial pole induction motor which comprises the steps of forming a flat central rotor portion from magnetic material with spaced radial projections separated by notches, forming a flat outer rotor portion of non-magnetic electroconductive material having an inner edge of a shape complementary to the projections and notches, the outer portion having a greater axial thickness than the central portion, separately assembling each pair of central and outer portions concentrically in a common plane to form a rotor section, assembling a plurality of the rotor sections in adjacent parallel relation with the outer portions engaging each other, and compressing the assembled sections axially to force the central portions into substantial contact with each other and to force the material of the outer portions firmly around the central portions.

11. A rotor for an axial pole induction motor comprising a plurality of rotor sections each made up of a center of magnetic material having a series of radiating lobes with intermediate notches and an enclosing disk of non-magnetic material of low ohmic resistance accurately fitting the contour of the lobes and notches, and a pair of end plates of similar non-magnetic material between which the sections are fixed, one of the plates having means for aligning said sections and holding them together.

12. A thin individual section for a rotor of the class described comprising a central portion of magnetic material having spaced radial projections with intermediate notches, and a coplanar outer portion of electrically conductive non-magnetic material complementarily fitting the projections and notches and providing a continuous conductive path around their periphery.

13. A section according to claim 12, in which the axial thickness of the outer portion is greater than the thickness of the central portion.

14. A section according to claim 12 in which the radial distance from the rotor axis to the inner edge of each notch is substantially one-half the radial distance from the axis to the outer edge of each projection.

15. A rotor for an axial pole induction motor comprising a plurality of rotor sections, each consisting of a central portion of magnetic material having spaced radial projections with intermediate notches and an outer coplanar portion of electrically conductive non-magnetic material complementarily fitting the projections and notches and providing a continuous conductive path around their periphery, and a pair of end plates of electrically conductive material between which the intermediate sections are fixed.

16. A rotor according to claim 15 in which the outer portions of the rotor section have aligned peripheral notches and one of the plates has an axially extending finger received in said notches and securing the sections together.

LEONARD E. ASKE.

REFERENCES CITED

The following references are of record in the file of this patent:

UNITED STATES PATENTS

| Number | Name | Date |
|---|---|---|
| 428,650 | Thomson | May 27, 1890 |
| 1,435,357 | Weber | Nov. 14, 1922 |
| 2,004,866 | Haldeman | June 11, 1935 |
| 2,187,033 | Hubacker | Jan. 16, 1940 |
| 2,205,077 | Zullo | June 18, 1940 |
| 2,247,489 | Gottlieb et al. | July 1, 1941 |
| 2,286,008 | Pfalzgraff | June 9, 1942 |
| 2,316,960 | Ingersoll | Apr. 20, 1943 |
| 2,349,620 | Hansen et al. | May 23, 1944 |